US011685418B2

(12) United States Patent
Zhang

(10) Patent No.: US 11,685,418 B2
(45) Date of Patent: Jun. 27, 2023

(54) ROTATIONAL JOINT AND PRODUCT FOR CHILDREN HAVING THE SAME

(71) Applicant: GOODBABY CHILD PRODUCTS CO., LTD., Jiangsu (CN)

(72) Inventor: Hongtao Zhang, Jiangsu (CN)

(73) Assignee: GOODBABY CHILD PRODUCTS CO., LTD., Jiangsu (CN)

(*) Notice: Subject to any disclaimer, the term of this patent is extended or adjusted under 35 U.S.C. 154(b) by 232 days.

(21) Appl. No.: 17/291,760

(22) PCT Filed: Dec. 19, 2018

(86) PCT No.: PCT/CN2018/121885
§ 371 (c)(1),
(2) Date: May 6, 2021

(87) PCT Pub. No.: WO2020/093531
PCT Pub. Date: May 14, 2020

(65) Prior Publication Data
US 2021/0387659 A1  Dec. 16, 2021

(30) Foreign Application Priority Data

Nov. 8, 2018  (CN) .......................... 201811325497.9

(51) Int. Cl.
*B62B 7/06*  (2006.01)
*B62B 7/08*  (2006.01)

(52) U.S. Cl.
CPC .............. *B62B 7/062* (2013.01); *B62B 7/083* (2013.01)

(58) Field of Classification Search
CPC ................................ B62B 7/062; B62B 7/083
See application file for complete search history.

(56) References Cited

U.S. PATENT DOCUMENTS 7,401,803 B1     7/2008  Lai
8,282,120 B2 *  10/2012  Minato ................... B62B 7/142
                                                                 280/47.38
(Continued)

FOREIGN PATENT DOCUMENTS

CN     103072609 A    5/2013
CN     104369762 A    2/2015
(Continued)

OTHER PUBLICATIONS

International Search Report and Written Opinion for International Patent Application No. PCT/CN2018/121885, dated Aug. 2, 2019, in 10 pages.

*Primary Examiner* — Erez Gurari
(74) *Attorney, Agent, or Firm* — Knobbe, Martens, Olson & Bear, LLP

(57) ABSTRACT

Disclosed are a rotational joint and a product for children having the rotational joint. The rotational joint includes a first connecting base, a second connecting base and a base rotationally connected about a same rotation center line, the rotational joint further includes a linkage member, and the linkage member is arranged in such a manner that the linkage member is capable of only linearly moving relative to the base; the linkage member and the first connecting base is provided with a first guide slot and a first guide pillar the linkage member and the second connecting base is provided with a second guide slot and a second guide pillar The rotational joint can be used for products for children, such as strollers and child sitting saddles, to realize linked unfolding and folding of the respective rod members.

20 Claims, 13 Drawing Sheets

(56) References Cited

U.S. PATENT DOCUMENTS

| | | | | |
|---|---|---|---|---|
| 8,696,015 B2* | 4/2014 | Karremans | ............ | B62B 7/064 280/647 |
| 8,870,213 B1* | 10/2014 | Xu | ............ | B62B 7/08 280/647 |
| 8,905,428 B2* | 12/2014 | Schroeder | ............ | B62B 7/08 280/650 |
| 9,475,516 B1* | 10/2016 | Wang | ............ | B62B 7/10 |
| 9,642,767 B1* | 5/2017 | Kavanagh | ............ | A61H 3/00 |
| 10,787,188 B2* | 9/2020 | Popp | ............ | B62B 7/064 |
| 11,247,711 B2* | 2/2022 | Kwok | ............ | B62B 7/10 |
| 11,577,132 B2* | 2/2023 | Payne | ............ | B62B 5/06 |
| 2007/0284855 A1* | 12/2007 | Lin | ............ | B62B 3/12 280/651 |
| 2011/0084467 A1* | 4/2011 | Liao | ............ | B62B 7/08 280/642 |
| 2011/0181024 A1* | 7/2011 | Chicca | ............ | B62B 7/08 280/642 |
| 2012/0187660 A1* | 7/2012 | Liao | ............ | B62B 7/086 280/642 |
| 2013/0147162 A1* | 6/2013 | Hsu | ............ | B62B 7/062 280/647 |
| 2014/0334867 A1* | 11/2014 | Su | ............ | B62B 7/062 403/106 |
| 2015/0344058 A1* | 12/2015 | Liu | ............ | B62B 7/062 280/647 |
| 2016/0046314 A1* | 2/2016 | Zehfuss | ............ | B62B 9/104 297/354.12 |
| 2017/0217470 A1* | 8/2017 | Popp | ............ | B62B 7/14 |
| 2018/0065655 A1* | 3/2018 | Leys | ............ | B62B 7/064 |
| 2018/0362065 A1* | 12/2018 | Cheng | ............ | F16H 19/001 |
| 2019/0256120 A1* | 8/2019 | Oakes | ............ | B62B 7/142 |
| 2020/0283051 A1* | 9/2020 | Liao | ............ | B62B 7/062 |
| 2020/0353967 A1* | 11/2020 | Horst | ............ | B62B 7/064 |
| 2021/0309276 A1* | 10/2021 | Kwok | ............ | B62B 9/102 |
| 2021/0387659 A1* | 12/2021 | Zhang | ............ | B62B 7/064 |
| 2022/0111882 A1* | 4/2022 | Dziak | ............ | B62B 7/062 |
| 2022/0169297 A1* | 6/2022 | Pujol | ............ | B62B 7/062 |
| 2023/0042740 A1* | 2/2023 | Yuan | ............ | B62B 7/062 |

FOREIGN PATENT DOCUMENTS

| | | |
|---|---|---|
| CN | 207565667 U | 7/2018 |
| CN | 109625068 A | 4/2019 |
| DE | 29613874 U1 | 2/1997 |

\* cited by examiner

US 11,685,418 B2

ROTATIONAL JOINT AND PRODUCT FOR CHILDREN HAVING THE SAME

CROSS-REFERENCE TO RELATED APPLICATIONS

This application is the U.S. National Phase under 35 U.S.C. § 371 of International Application PCT/CN2018/121885, filed Dec. 19, 2018, which is hereby incorporated by reference in its entirety, and which claims priority to Chinese Patent Application No. 201811325497.9, filed Nov. 8, 2018.

TECHNICAL FIELD

The present disclosure relates to a rotational joint and a product for children having the rotational joint.

BACKGROUND

In the prior art, children's products such as strollers, children's sitting saddles, and children's cribs mostly adopt a foldable structure, and they usually adopt multiple rods to rotate and connect to form a linkage mechanism, to realize the linked unfolding and folding of the rods, and the number of rods of the linkage mechanism is large, which causes the frame to become complicated. Although there are some frames with simple structures on the market, they cannot realize linkage unfolding and folding, or there is linkage, but the structure is very complicated and the operation is inconvenient.

SUMMARY

The purpose of the present disclosure is to overcome the deficiencies of the prior art, and to provide a rotational joint with a novel structure.

To achieve the above purpose, the technical solution employed by the present disclosure is: a rotational joint used for a rotational connection among at least three support rods, wherein one of the support rods is a base rod having a base, and the rest of the support rods comprises a first rod having a first connecting base and a second rod having a second connecting base, the first connecting base, the second connecting base and the base are rotationally connected about a same rotation center line, the rotational joint further comprises a linkage member, and the linkage member is arranged in such a manner that the linkage member is capable of only linearly moving relative to the base;

one of the linkage member and the first connecting base is provided with a first guide slot, and the other one is provided with a first guide pillar, and the first guide pillar is capable of being relatively slidably inserted in the first guide slot; one of the linkage member and the second connecting base is provided with a second guide slot, and the other one is provided with a second guide pillar, and the second guide pillar is capable of being relatively slidably inserted in the second guide slot, wherein, an extension direction of the first guide slot and a linear movement direction of the linkage member are not parallel or collinear with each other, and an extension direction of the second guide slot and the linear movement direction of the linkage member are not parallel or collinear with each other.

According to the present disclosure, preferably, the extension direction of the first guide slot and the linear movement direction of the linkage member are perpendicular to each other, and/or, the extension direction of the second guide slot and the linear movement direction of the linkage member are perpendicular to each other.

According to the present disclosure, preferably, the first guide slot and the second guide slot are both provided on the linkage member, and correspondingly, the first guide pillar is provided on the first connecting base, and the second guide pillar is provided on the second connecting base.

Further, the extension direction of the first guide slot and the extension direction of the second guide slot are parallel to each other or extend in a same direction.

Preferably, the first guide slot is provided on the first connecting base, and the second guide slot is provided on the second connecting base, and correspondingly, the first guide pillar and the second guide pillar are both provided on the linkage member.

Preferably, the linear movement direction of the linkage member is perpendicular to the rotation center line.

According to the present disclosure, preferably, at least one set of guiding mechanism is provided between the linkage member and the base, and each set of guiding mechanism comprises a sliding pillar arranged on one of the base and the linkage member and extending along the linear movement direction of the linkage member, and a guide hole for the sliding pillar to insert along its length direction in a sliding fit manner which is arranged on the other one of the base and the linkage member.

Further, the linkage member has a protrusion portion, the guide hole is opened on the protrusion portion, and the sliding pillar is provided on the base.

According to another preferred aspect of the present disclosure, at least one set of guiding mechanism is provided between the linkage member and the base, each set of guiding mechanism comprises a projecting pillar arranged on one of the base and the linkage member, and a sliding slot arranged on the other one of the base and the linkage member and extending along a linear direction, and the projecting pillar is slidably inserted in the sliding slot.

In a specific implementation, the projecting pillar is arranged on the linkage member, and the sliding slot is arranged on the base.

In a specific implementation, the linkage member is further provided with a through slot extending in a linear direction, the base, the first connecting base and the second connecting base are rotationally connected via a rotational shaft, the rotational shaft is capable of being rotated around its own axis and can be slidably inserted in the through slot along the through slot, an extension direction of the through slot is perpendicular to a shaft axis of the rotational shaft, and the extension direction of the through slot and an extension direction of the sliding slot are parallel to each other or extend in a same direction.

In a specific implementation, two sets of guiding mechanisms are provided, and in the two sets of guiding mechanisms, length extension directions of the sliding slots are parallel to each other or extend in a same direction.

In a specific implementation, the projecting pillars are arranged on the linkage member, and the two projecting pillars are located on a same side of the linkage member.

In a specific implementation, the linkage member comprises a first mounting rod portion and a second mounting rod portion that cross each other in a cross shape, the first guide slot and the second guide slot are respective arranged on two end portions of the first mounting rod portion, and the two projecting pillars are respectively arranged on two end portions of the second mounting rod portion.

In a specific implementation, the two projecting pillars are arranged symmetrically with respect to a center line of the first mounting rod portion, and the first guide slot and the second guide slot are arranged symmetrically with respect to a center line of the second mounting rod portion.

Preferably, the guiding mechanism further comprises a sleeve sleeved on the projecting pillar to be rotatable around its own axis, and the sleeve is fittingly inserted in the sliding slot.

According to the present disclosure, preferably, the first guide pillar and the second guide pillar are respectively sleeved with sleeves, the first guide pillar sleeved with the sleeve is fittingly inserted in first guide slot, and the second guide pillar sleeved with the sleeve is fittingly inserted in second guide slot.

According to the present disclosure, preferably, the linkage member comprises a first linkage rod portion and a second linkage rod portion, wherein one end of the first linkage rod portion and one end of the second linkage rod portion are connected to form a V-shape, the first guide slot or the first guide pillar is arranged on the other end portion of the first linkage rod portion, and the second guide slot or the second guide pillar is arranged on the other end portion of the second linkage rod portion.

According to another preferred implementation of the present disclosure, the base comprises a first base body and a second base body, the first base body and the second base body cooperate with each other to form an accommodating space, the first connecting base, the second connecting base and the linkage member are located between the first base body and the second base body, and the linkage member is located in the accommodating space.

According to the present disclosure, preferably, the rotational joint further comprises a lock mechanism for locking the base, the first connecting base and the second connecting base with respect to each other, the lock mechanism comprises a lock pin movably arranged along a direction perpendicular to the rotation center line, one of the base, the first connecting base and the second connecting base is provided with a lock slot for the lock pin to linearly move, and the other two of the base, the first connecting base and the second connecting base are provided with a cooperating slot, respectively, each cooperating slot comprises a lock slot portion for the lock pin to linearly move, and an arc-shaped guide slot portion in communication with the lock slot portion and taking the rotation center line as a rotation center, and when the lock mechanism is in a locked state, the lock pin is inserted into the lock slot and the lock slot portions of the two cooperating slots at the same time.

A purpose of the present disclosure is to provide a product for children having a rotational joint mentioned above.

To achieve the above purpose, the technical solution employed by the present disclosure is: a product for children, comprises at least three support rods, the at least three support rods are rotationally connected via a rotational joint mentioned above.

Preferably, the product for children is a stroller having a frame, the frame comprises a front support, a rear support and a push rod frame, an upper portion of the front support, an upper portion of the rear support and a lower portion of the push rod frame are rotationally connected via the rotational joint, wherein, the rear support is the base rod.

Due to the use of the above technical solutions, the present disclosure has the following advantages over the prior art: in the rotational joint of the present disclosure, a plurality of rotatably connected rods is linked by providing the linkage member, so that when one rod member is driven to rotate, the other rod members can be linked to rotate relatively. The rotational joint can be used for products for children, such as strollers and child sitting saddles, to realize linked unfolding and folding of the respective rods, which not only reduces the number of rods in the products for children, but also makes the products for children simpler, and makes the unfolding and folding operations of products for children more convenient.

Figure 1:
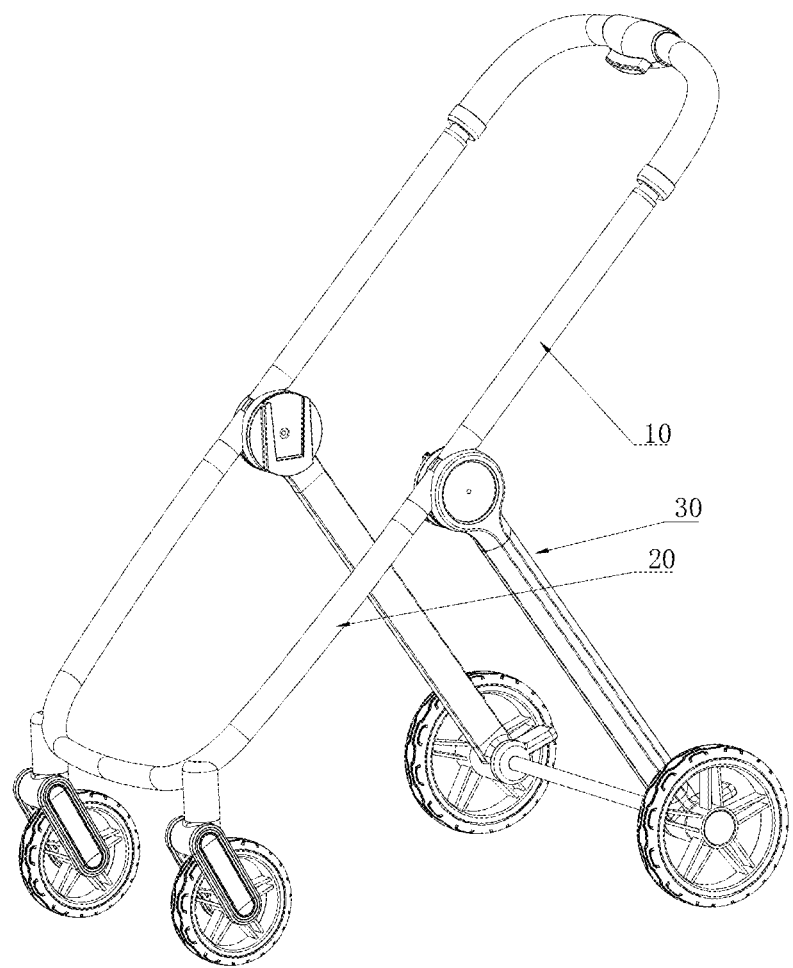
FIG. 1 is a three-dimensional diagram of a stroller in an unfolded state of Embodiment 1 of the present disclosure.

wherein, 10—push rod frame (first rod); 20—front support (second rod); 30—rear support (base rod);

1—first connecting base; 11—first guide pillar; 12—lock slot; 13—avoiding slot; 2—second connecting base;

21—second guide pillar; 22—cooperating slot; 22a—lock slot portion; 22b—arc-shaped guide slot portion; 3—base; 3a—first base body; 3b—second base body; 31—first sliding slot; 32—second sliding slot; 33—cooperating groove; 33a—lock slot portion; 33b—arc-shaped guide slot portion; 34—square sliding slot; 35—sliding pillar; 4—linkage member; 4a—first mounting rod portion; 4b—second mounting rod portion; 4c—first linkage rod portion; 4d—second linkage rod portion; 4e—avoiding gap; 41—first guide slot; 42—second guide slot; 43—first projecting pillar; 44—second projecting pillar; 45—through slot; 46—square projecting pillar; 47—protrusion portion; 48—guide hole; 5—lock pin; 6—rotational shaft; 7—pulling cord.

DETAILED DESCRIPTION OF EXEMPLARY EMBODIMENTS

In the following, the technical solutions of the present disclosure are further explained in detail combining with the accompanying drawings and specific embodiments.

Embodiment 1

Referring to FIG. 1 to FIG. 13, a stroller has a folding frame, and the frame comprises a front support 20, a rear support 30 and a push rod frame 10, an upper portion of the front support 20, an upper portion of the rear support 30 and a lower portion of the push rod frame 10 support are rotationally connected via a rotational joint, the rotational joint comprises a base 3, a first connecting base 1 and a second connecting base 2 that are rotationally connected about a same rotation center line X-X. In this embodiment, the rear support 30 serves as a base rod, and the base is arranged on the upper portion thereof; the push rod frame 10 serves as a first rod, and the first connecting base 1 is arranged on the lower portion thereof; the front support 20 serves as a second rod, and the second connecting base 2 is arranged on the upper portion thereof, the base 3, the first connecting base 1 and the second connecting base 2 are rotationally connected about a rotational shaft 6, and the axis of the rotational shaft 6 constitutes the rotation center line X-X of relative rotation of the three.

Figure 2:
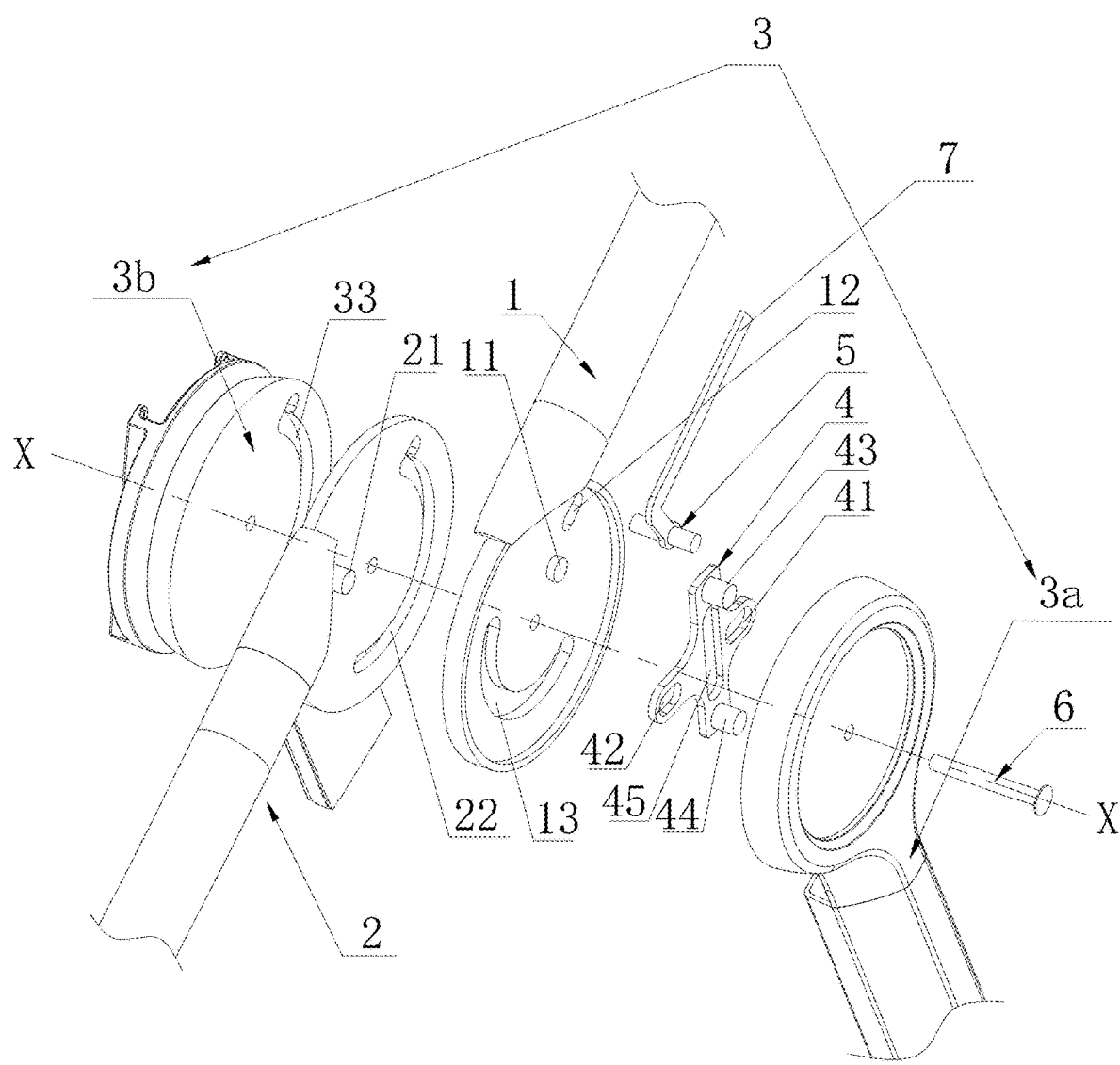
FIG. 2 is a first structural exploded schematic diagram of the rotational joint in Embodiment 1.
Figure 3:
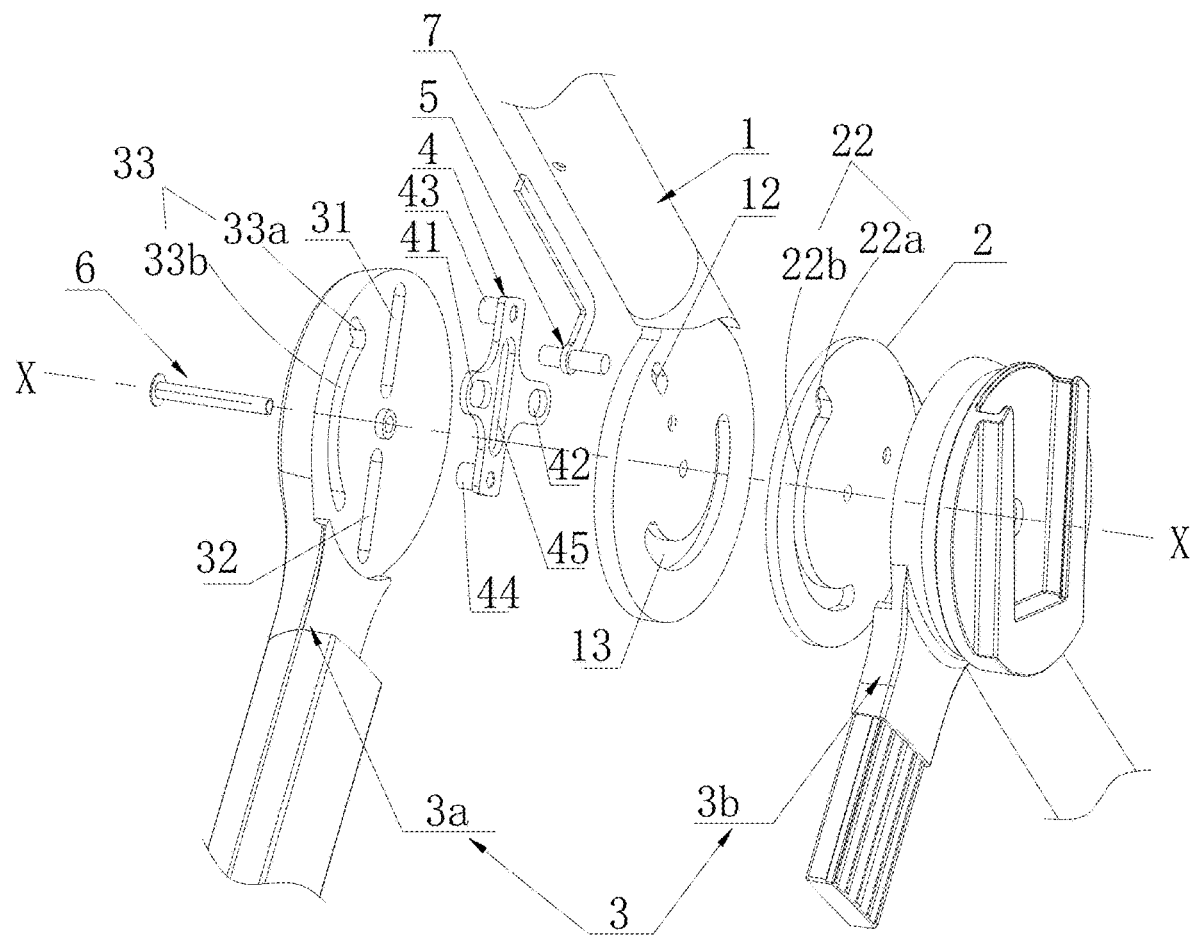
FIG. 3 is a second structural exploded schematic diagram of the rotational joint in Embodiment 1.
Figure 4:
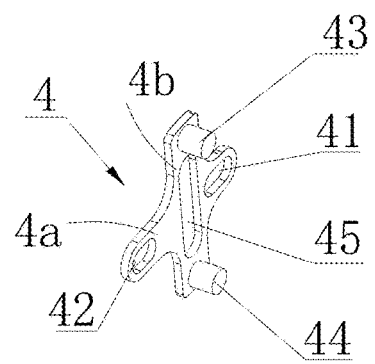
FIG. 4 is a structural schematic diagram of a linkage member in the rotational joint of Embodiment 1.

Referring to FIG. 2 to FIG. 4, the rotational joint further comprises a linkage member 4, and the linkage member 4 is arranged in such a manner that the linkage member 4 can only linearly move relative to the base 3; the linkage member 4 is further provided with a first guide slot 41 and a second guide slot 42, the extension directions of the first guide slot 41 and the second guide slot 42 are arranged to intersect the linear movement direction of the linkage member 4, that is to say, the extension direction of the first guide slot 41 and the linear movement direction of the linkage member 4 are not parallel or collinear with each other, and the extension direction of the second guide slot 42 and the linear movement direction of the linkage member 4 are also not parallel or collinear with each other. The first connecting base 1 is provided with a first guide pillar 11, the second connecting base 2 is provided with a second guide pillar 21, the first guide pillar 11 can be relatively slidably inserted in the first guide slot 41, and the second guide pillar 21 can be relatively slidably inserted in the second guide slot 42.

Of course, in some other embodiments, it is also possible to arrange the first guide pillar 11 on the linkage member 4 and arrange the first guide slot 41 on the first connecting base 1, and/or, arrange the second guide pillar 21 on the linkage member 4 and arrange the second guide slot 42 on the second connecting base 2.

In this embodiment, the linear movement direction of the linkage member 4 is perpendicular to or nearly perpendicular to the axis of the rotational shaft 6, the extension direction of the first guide slot 41 and the extension direction of the second guide slot 42 are parallel to each other or extend in the same direction, here, the extension directions of the first guide slot 41 and the second guide slot 42 are collinear and perpendicular to the linear movement direction of the linkage member 4. Here, the first guide pillar 11 and the second guide pillar 21 are separately arranged on two different sides of the linear movement direction of the linkage member 4, so that the angle range of the linkage adjustment between the base 3 and the first connecting base 1 and the second connecting base 2 is relatively large.

The first guide pillar 11 and the second guide pillar 21 are preferably provided in a cylindrical shape, and in some embodiments, the first guide pillar 11 and the second guide pillar 21 are rotationally sleeved with cylindrical sleeves (not shown), then the sleeves correspondingly insert the first guide slot 41 and the second guide slot 42, so that the sliding frictions between the first guide pillar 11 and the first guide slot 41 and between the second guide pillar 21 and the second guide slot 42 are converted into rolling frictions between the sleeves and the first guide slot 41 and the second guide slot 42, to reduce the frictions.

At least one set of guiding mechanism is provided between the linkage member 4 and the base 3, each set of guiding mechanism comprises a projecting pillar arranged on one of the base 3 and the linkage member 4, and a sliding slot arranged on the other one and extending along a linear direction, the extension direction of the sliding slot is perpendicular to or nearly perpendicular to the axis of the rotational shaft 6, and the projecting pillar is slidably inserted in the sliding slot.

In this embodiment, two sets of guiding mechanisms are provided, the projecting pillars are cylindrical, and are a first projecting pillar 43 and a second projecting pillar 44 respectively arranged on the linkage member 4, two sets of sliding slots are correspondingly provided, and are a first sliding slot 31 and a second sliding slot 32 respectively arranged on the base 3, the length extension directions of the first sliding slot 31 and the second sliding slot 32 are parallel to each other or extend in the same direction, the first projecting pillar 43 is correspondingly inserted in the first sliding slot 31, and the second projecting pillar 44 is correspondingly inserted in the second sliding slot 32, so that the guide for the movement of the linkage member 4 is realized.

In some embodiment, the first projecting pillar 43 and the second projecting pillar 44 can be rotatably sleeved with cylindrical sleeves (not shown), then the cylindrical sleeves correspondingly insert the first sliding slot 31 and the second sliding slot 32, so that the sliding frictions during the guide movement can be converted into rolling frictions, the frictions are reduced, and it is more conducive to the improvement of the working flexibility of the rotational joint.

Referring to FIG. 2 and FIG. 3, the linkage member 4 is further provided with a through slot 45 extending in a linear direction, the rotational shaft 6 can be rotated around its own axis and can be slidably inserted through the through slot 45 along the through slot 45 so as to provide a way for the rotational shaft 6 when the linkage member 4 moves linearly, the extension direction of the through slot 45 is perpendicular to or nearly perpendicular to the shaft axis of the rotational shaft 6, and the extension direction of the through slot 45 and the extension direction of the first sliding slot 31 and the second sliding slot 32 extend in the same direction. In some other embodiments, due to that the through slot 45 is arranged to cooperate with the rotational shaft 6 to have a guide function, only one set of guiding mechanism between the linkage member 4 and the base 3 may be provided, that is to say, only one of the first projecting pillar 43 and the second projecting pillar 44 needs to be provided, and correspondingly, only one of the first sliding slot 31 and the second sliding slot 32 may be provided, and the extension direction of the sliding slot 31/32 and the extension direction of the through slot 45 are parallel to each other or extend in the same direction, which can also realize the guide for the movement of the linkage member 4.

Referring to FIG. 2 to FIG. 4, in this embodiment, the first projecting pillar 43 and the second projecting pillar 44 are arranged on the same side of the linkage member 4, the linkage member 4 comprises a first mounting rod portion 4a and a second mounting rod portion 4b that cross each other in a cross shape, the first guide slot 41 and the second guide slot 42 are respective arranged on two end portions of the first mounting rod portion 4a, the first projecting pillar 43 and the second projecting pillar 44 are respectively arranged on two end portions of the second mounting rod portion 4b, here, the center line of the first mounting rod portion 4a and the center line of the second mounting rod portion 4b intersect perpendicularly or nearly perpendicularly, the first projecting pillar 43 and the second projecting pillar 44 are arranged symmetrically with respect to the center line of the first mounting rod portion 4a, and the first guide slot 41 and the second guide slot 42 are arranged symmetrically with respect to the center line of the second mounting rod portion 4b.

Referring to FIG. 2 and FIG. 3, in this embodiment, the base 3 comprises a first base body 3a and a second base body 3b, the first base body 3a and the second base body 3b cooperate with each other to form an accommodating space, the first connecting base 1, the second connecting base 2 and the linkage member 4 are located between the first base body 3a and the second base body 3b, and the linkage member 4 is located in the above accommodating space, so that the overall appearance of the rotational joint is very smooth, concise, and beautiful. Of course, in some other embodiments, the linkage member 4 may also be arranged outside the above accommodating space. In this embodiment, the first sliding slot 31 and the second sliding slot 32 are both arranged on the first base body 3a, the first projecting pillar 43 and the second projecting pillar 44 on the linkage member 4 correspondingly extend toward the first base body 3a and are inserted into the first sliding slot 31 and the second sliding slot 32, the first connecting base 1 is located between the second connecting base 2 and the linkage member 4, the first connecting base 1 is further provided with an arc-shaped avoiding slot 13 to provide a way for the second guide pillar 21 to insert into the second guide slot 42.

The rotational joint further comprises a lock mechanism for locking the base 3, the first connecting base 1 and the second connecting base 2 with respect to each other, the lock mechanism comprises a lock pin 5 movably arranged along the axis of the rotational shaft 6, one of the base 3, the first connecting base 1 and the second connecting base 2 is provided with a lock slot for the lock pin 5 to linearly move, and the other two are provided with cooperating slots. In this embodiment, the first connecting base 1 is provided with a lock slot 12, the second connecting base 2 is provided with a cooperating slot 22, the base 3 is provided with a cooperating slot 33, the cooperating slot 22 comprises a lock slot portion 22a for the lock pin 5 to linearly move and an arc-shaped guide slot portion 22b in communication with the lock slot portion 22a and taking the axis of the rotational shaft 6 as the rotation center, the cooperating slot 33 also comprises a lock slot portion 33a for the lock pin 5 to linearly move and an arc-shaped guide slot portion 33b in communication with the lock slot portion 33a and taking the axis of the rotational shaft 6 as the rotation center, and when the lock mechanism is in a locked state, the lock pin 5 is inserted into the lock slot 12 and the lock slot portions 22a, 33a at the same time; when the lock mechanism is unlocked, the first connecting base 1 and the second connecting base 2 can be rotated with respect to the base 3 around the rotational shaft 6, and the lock pin 5 can slide along the arc-shaped guide slot portions 22b, 33b. The first connecting base 1 is further provided with a pulling cord 7 connected with the lock pin 5 to drive the lock pin 5 to move and to switch between the locked position and the unlocked position.

Figure 5:
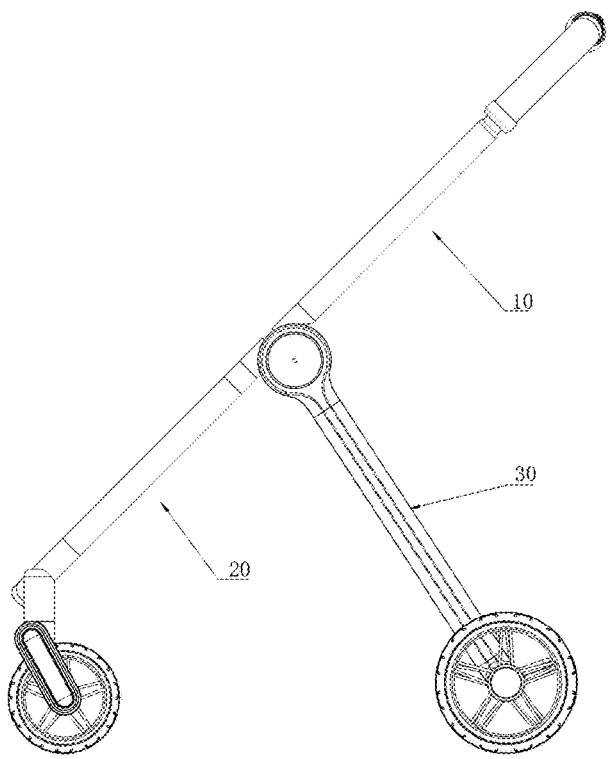
FIG. 5 is a side view of the stroller of Embodiment 1 in the unfolded state.
Figure 6:
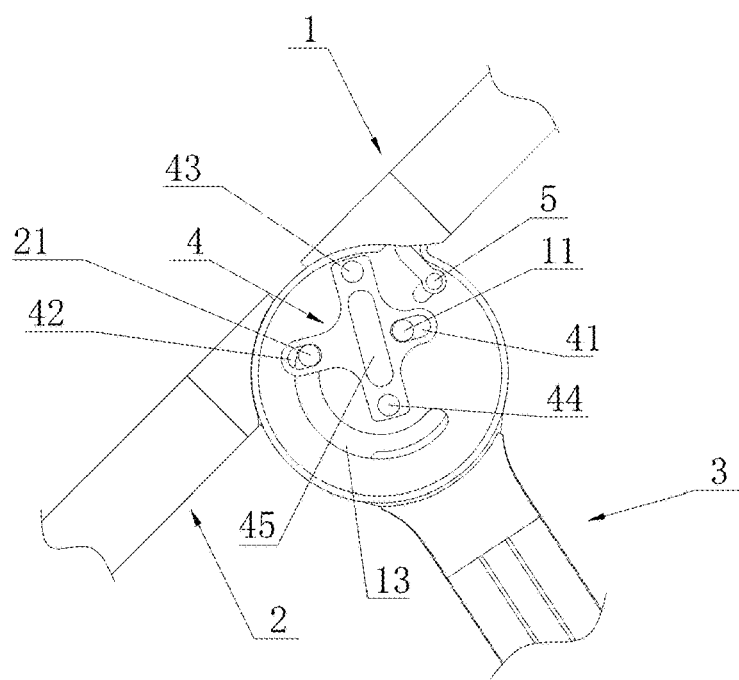
FIG. 6 is a first schematic diagram of the internal structure of the rotational joint in the stroller of FIG. 5.
Figure 7:
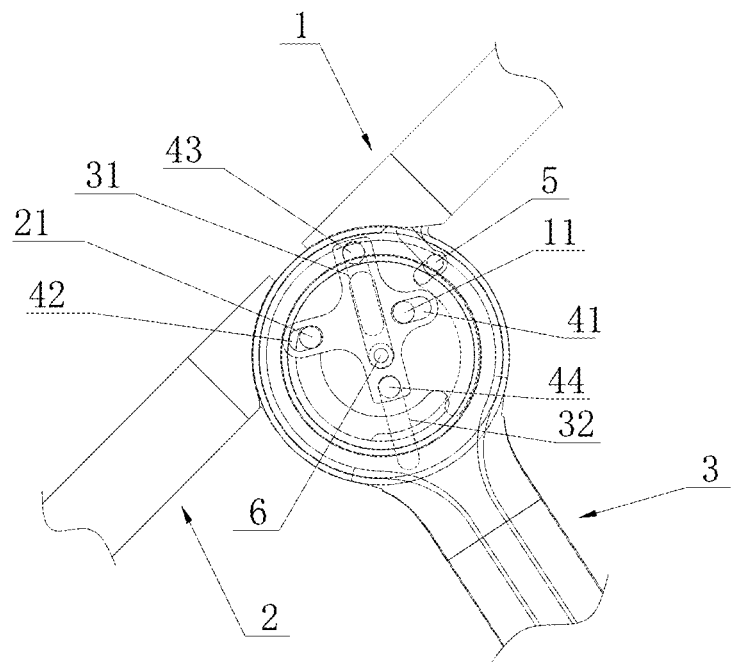
FIG. 7 is a second schematic diagram of the internal structure of the rotational joint in the stroller of FIG. 5.
Figure 8:
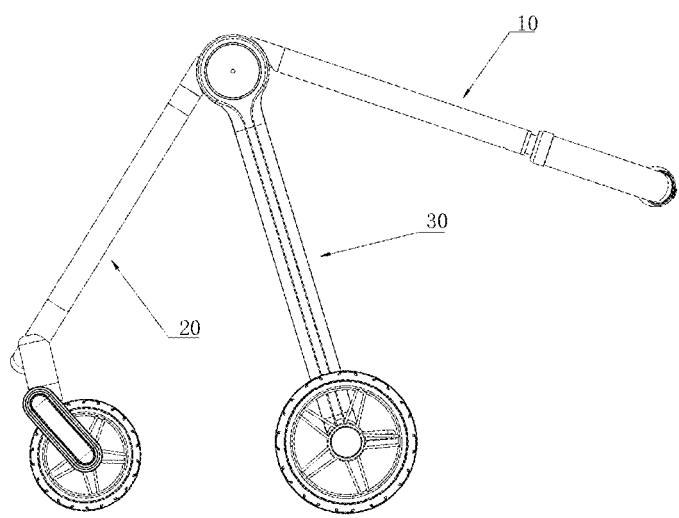
FIG. 8 is a side view of the stroller of Embodiment 1 during folding.
Figure 9:
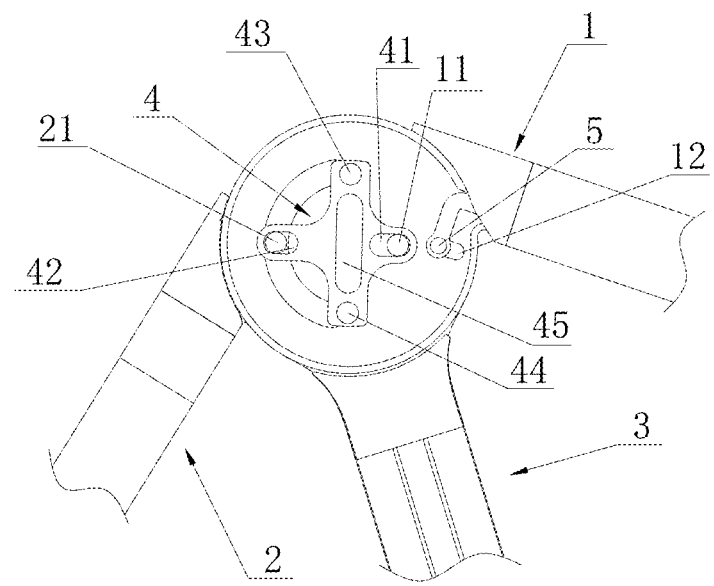
FIG. 9 is a first schematic diagram of the internal structure of the rotational joint in the stroller of FIG. 8.
Figure 10:
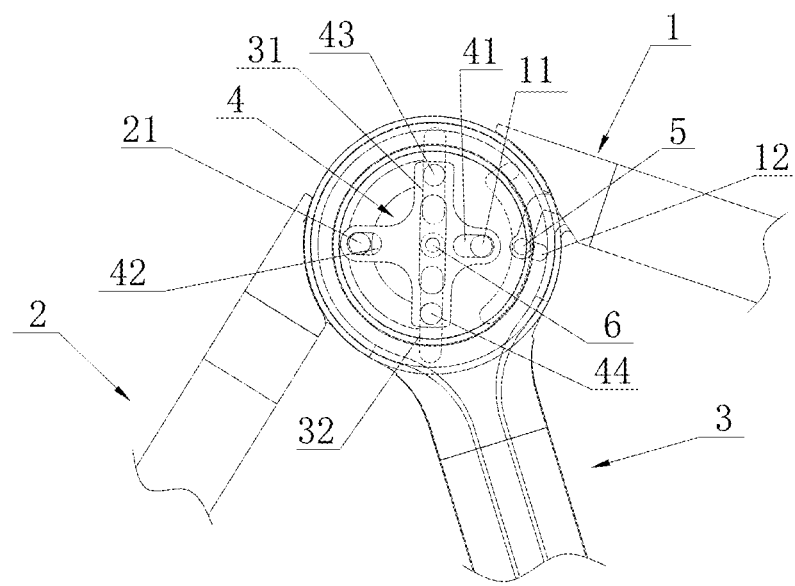
FIG. 10 is a second schematic diagram of the internal structure of the rotational joint in the stroller of FIG. 8.
Figure 11:
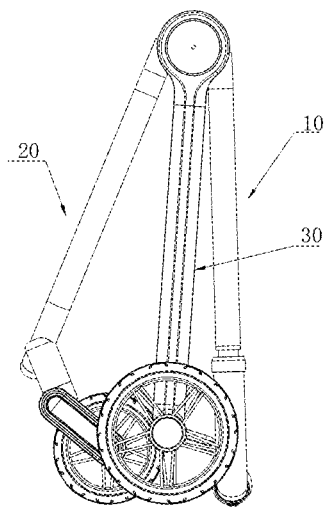
FIG. 11 is a side view of the stroller of Embodiment 1 in a folded state.
Figure 12:
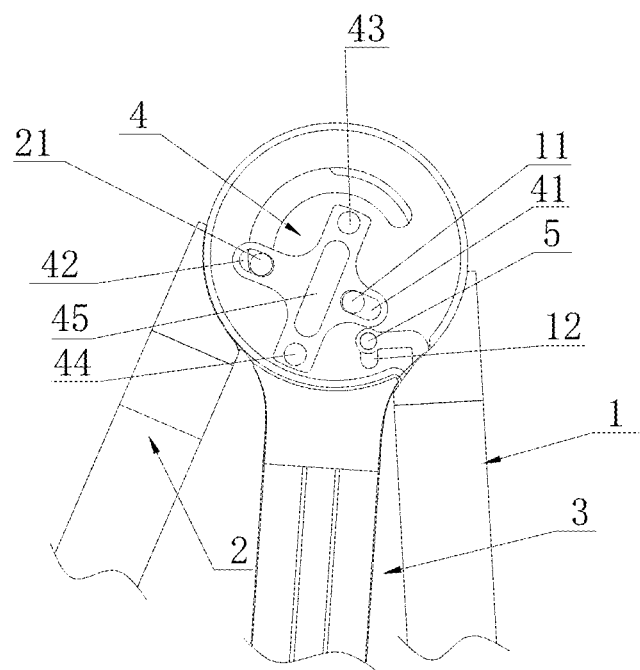
FIG. 12 is a first schematic diagram of the internal structure of the rotational joint in the stroller of FIG. 11.
Figure 13:
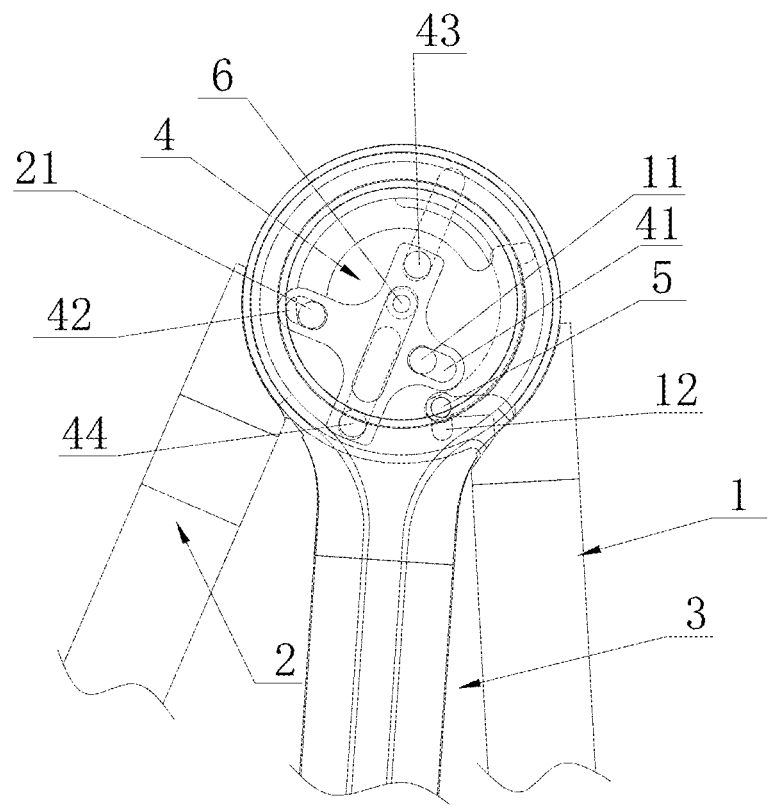
FIG. 13 is a second schematic diagram of the internal structure of the rotational joint in the stroller of FIG. 11.
Figure 14:
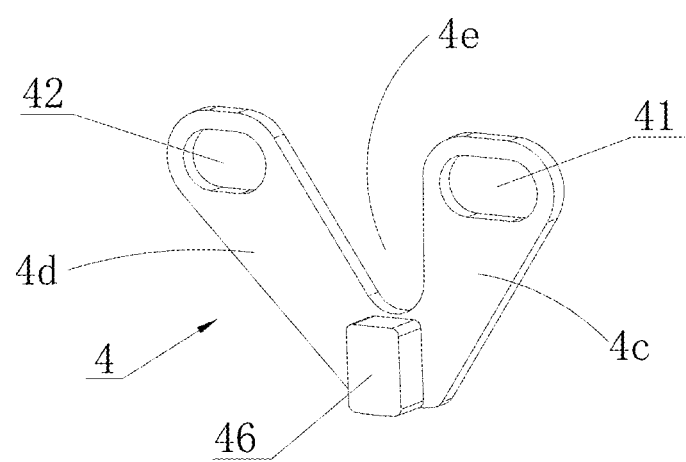
FIG. 14 is a structural schematic diagram of a linkage member in the rotational joint of Embodiment 2.
Figure 15:
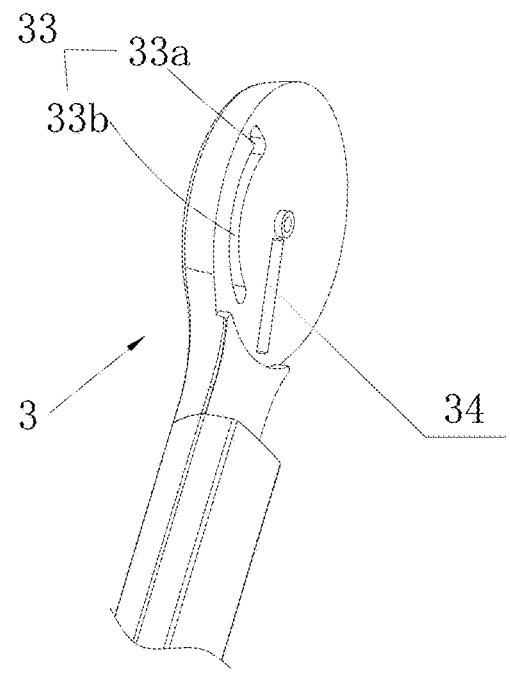
FIG. 15 is a schematic diagram of a partial structure of the base in the rotational joint of Embodiment 2.

Referring to FIG. 5 to FIG. 7, when the frame is in an unfolded state, and the lock mechanism of the rotational joint is locked, the first projecting pillar 43 and the second projecting pillar 44 are correspondingly inserted into the first sliding slot 31 and the second sliding slot 32 and can only linearly move perpendicular to the rotational shaft 6, the first guide pillar 11 is correspondingly inserted into the first guide slot 41, and the second guide pillar 21 is correspondingly inserted into the second guide slot 42.

When the pulling cord 7 is operated to slide the lock pin 5 and unlock the lock mechanism, the push rod frame 10 is pressed and pushed rearward and downward, as shown in FIG. 8 to FIG. 13, the first guide pillar 11 on the first connecting base 1 goes down to press the linkage member 4, and the linkage member 4 moves downwards under the guiding and restriction of the first and second projecting pillars 43, 44 and the first sliding slot 31 and the second sliding slot 32, so that the second guide slot 42 acts on the second guide pillar 21 to move downwards, so that the second connecting base 2 is rotated toward the base 3, so that during the rotation of the first connecting base 1 with respect to the base 3, the second connecting base 2 is also synchronously rotated with respect to the base 3 in linkage. That is, in the process of rotating the push rod frame 10 to close it relative to the rear support 30, the front support 20 is rotated and closed relative to the rear support 30 in linkage. Conversely, during the unfolding process of the frame, the front support 20 can be rotated and opened relative to the rear support 30 when the push rod frame 10 is turned over.

When used for the rotational connection between four or more rods, the cooperating structures of the guide pillars on the rods and the guide slots on the linkage member 4 are correspondingly increased, and adaptive adjustments are made on the rotational joint, the linkage unfolding and folding between the four or more rods can be realized.

Embodiment 2

Referring to FIG. 14 to FIG. 17, the difference between this embodiment and Embodiment 1 are mainly following two aspects.

In the first aspect, in this embodiment, the linkage member 4 is provided in a V shape, which includes a first linkage rod portion 4c and a second linkage rod portion 4d, one end of the first linkage rod portion 4c and one end of the second linkage rod portion 4d are connected, and the extension directions thereof form an acute angle and a V shape, and an giving-way gap 4e is formed between the two, and provides a way for the rotational shaft 6. The first guide slot 41 is provided on the other end of the first linkage rod portion 4c, and the second guide slot 42 is provided on the other end of the second linkage rod portion 4d.

In the second aspect, in this embodiment, one set of guiding mechanism is provided between the linkage member 4 and the base 3, and a projecting pillar and a sliding slot with a non-circular cross section are used for sliding fitting and guide, here, specifically, the projecting pillar uses a square projecting pillar 46 with a rectangular cross section, and the sliding slot is a square sliding slot 34 for the square projecting pillar 46 to be inserted correspondingly in a sliding fit, here, the square projecting pillar 46 is arranged on the linkage member 4, and the square sliding slot 34 is arranged on the base 3.

Figure 16:
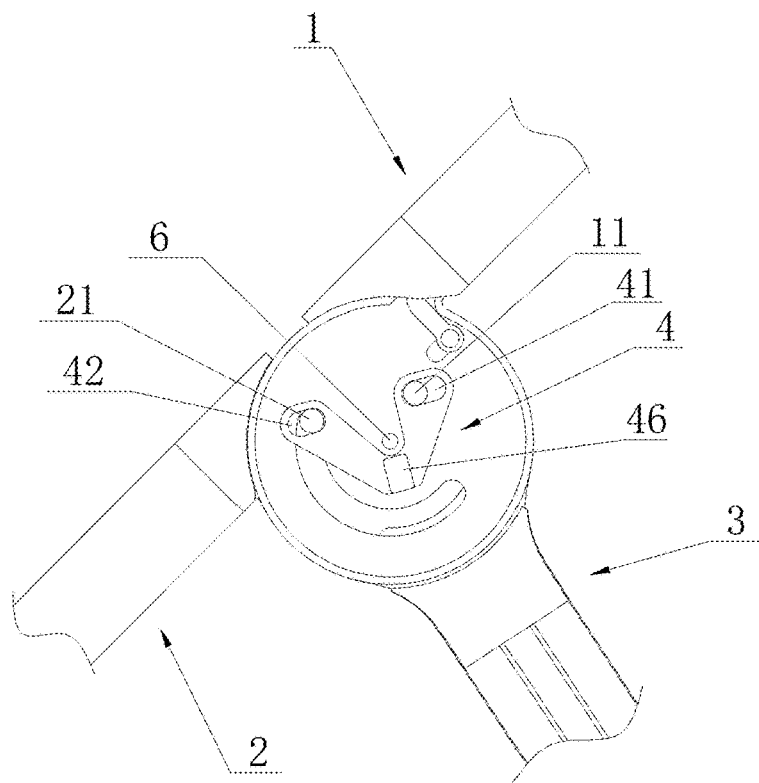
FIG. 16 is a first schematic diagram of the internal structure of the rotational joint of Embodiment 2.
Figure 17:
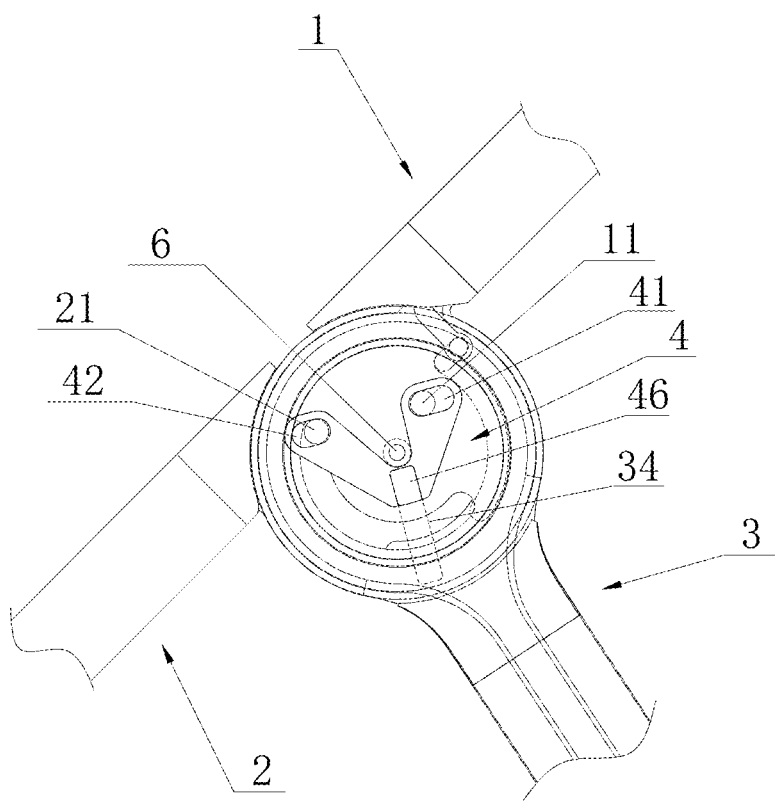
FIG. 17 is a second schematic diagram of the internal structure of the rotational joint of Embodiment 2.

The internal structure of the rotational joint of this embodiment is shown in FIG. 16 and FIG. 17, and its working principle is similar to that of the rotational joint of Embodiment 1, which will not be repeated here.

Embodiment 3

Referring to FIG. 18 to FIG. 21, the difference between this embodiment and Embodiment 2 is mainly in the arrangement of the guide structure between the linkage member 4 and the base 3.

Figures 18, 19:
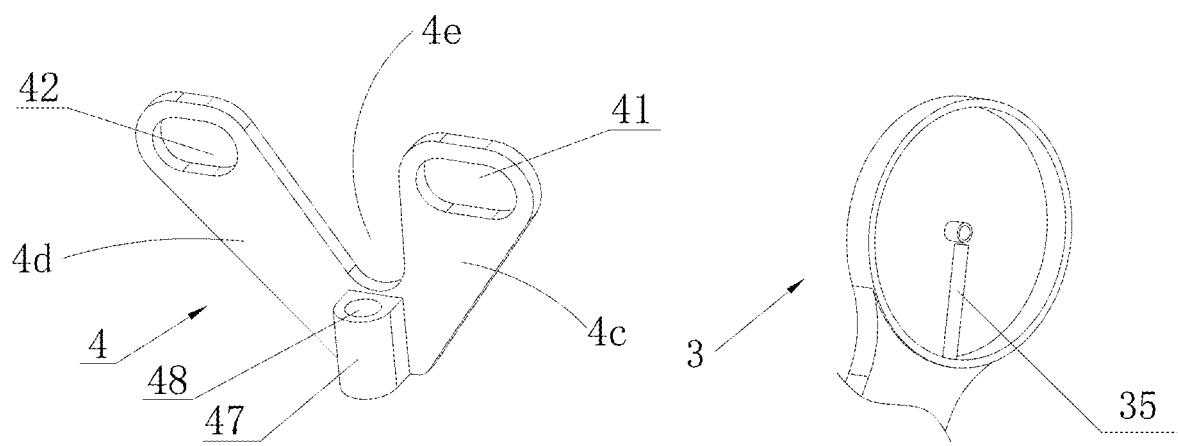
FIG. 18 is a structural schematic diagram of a linkage member in the rotational joint of Embodiment 3.
FIG. 19 is a schematic diagram of a partial structure of the base in the rotational joint of Embodiment 3.

In this embodiment, referring to FIG. 18 and FIG. 19, the guide structure comprises a protrusion portion 47 arranged on the linkage member 4, a guide hole 48 arranged on the protrusion portion 47, and a sliding pillar 35 arranged on the base 3, the depth direction of the guide hole 48 extends in the linear sliding direction of the linkage member 4, and the sliding pillar 35 is slidably inserted into the guide hole 48 along its length direction.

In some other embodiments, the sliding pillar 35 can also be arranged on the base 3, the length extension direction of the sliding pillar 35 is arranged to extend along the linear sliding direction of the linkage member 4, and the guide hole 48 is arranged on the base 3, which can also realize the guide for sliding between the base 3 and the linkage member 4.

Figure 20:
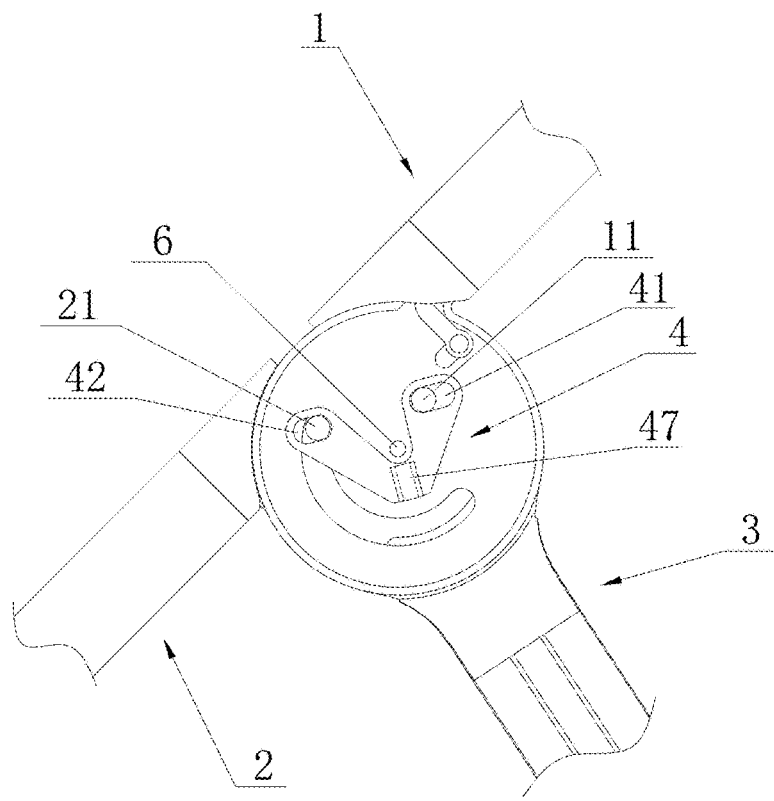
FIG. 20 is a first schematic diagram of the internal structure of the rotational joint of Embodiment 3.
Figure 21:
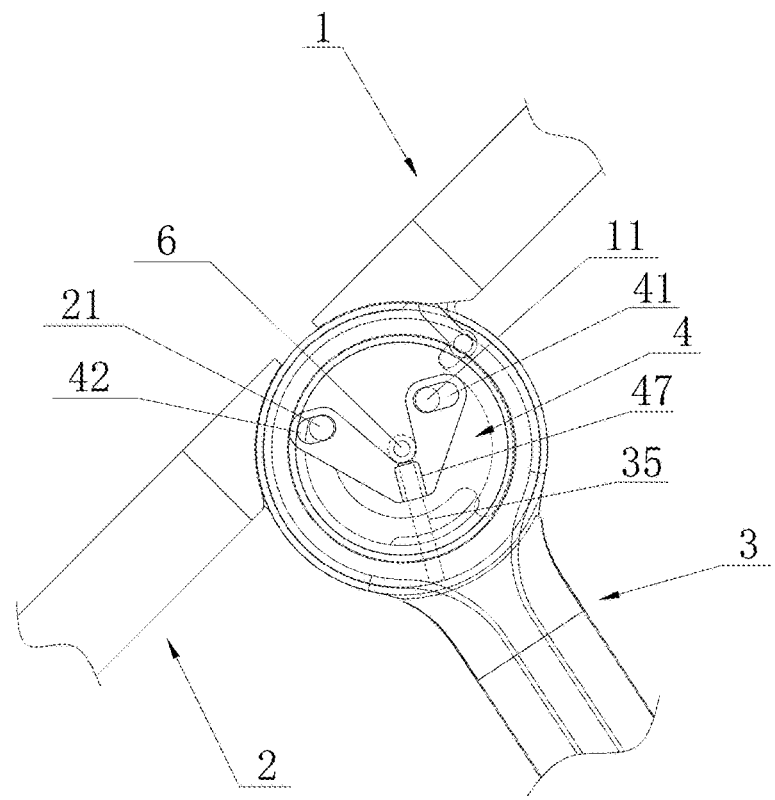
FIG. 21 is a second schematic diagram of the internal structure of the rotational joint of Embodiment 3.
Figure 22:
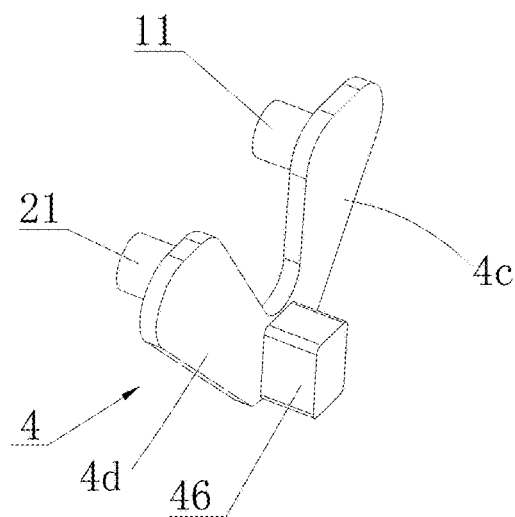
FIG. 22 is a structural schematic diagram of a linkage member in the rotational joint of Embodiment 4.
Figures 23, 24:
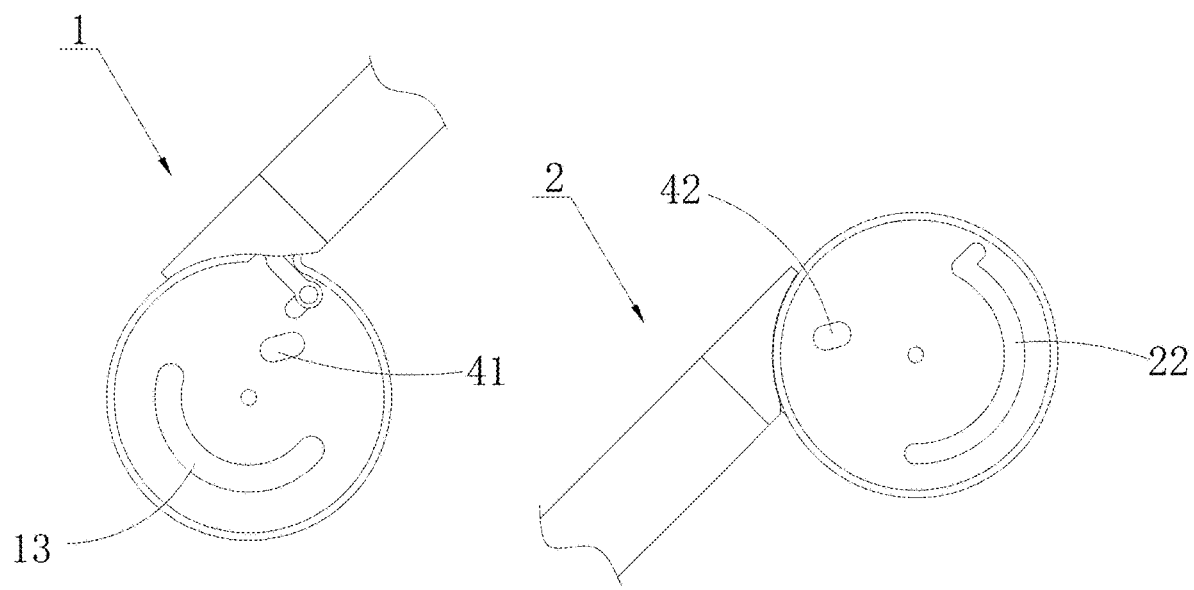
FIG. 23 is a schematic diagram of a partial structure of the first connecting base in the rotational joint of Embodiment 4.
FIG. 24 is a schematic diagram of a partial structure of the second connecting base in the rotational joint of Embodiment 4.

The internal structure of the rotational joint of this embodiment is shown in FIG. 20 and FIG. 21, and its working principle is similar to that of the rotational joint of Embodiment 2, which will not be repeated here.

Embodiment 4

Figure 25:
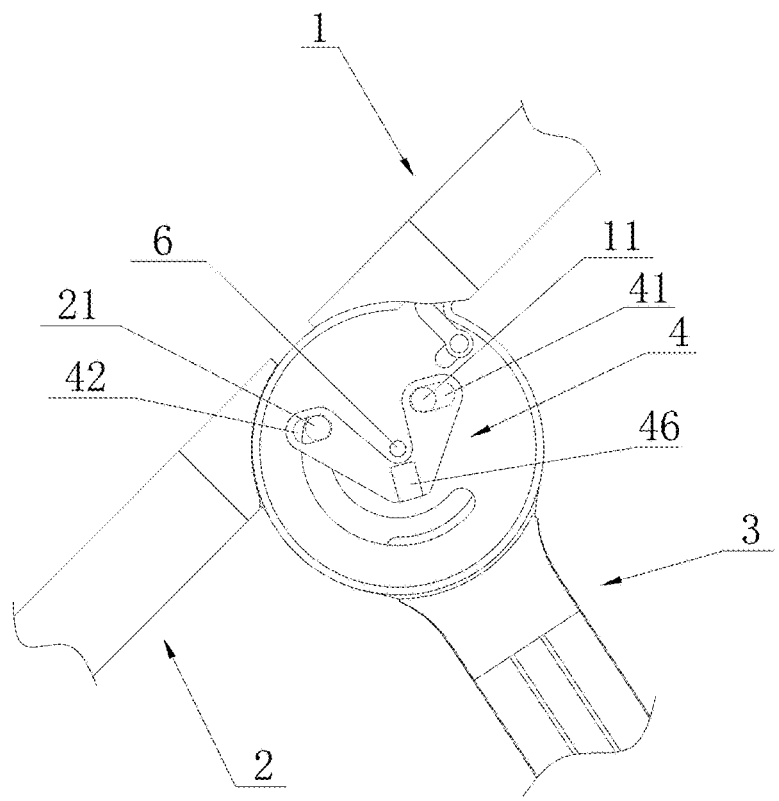
FIG. 25 is a first schematic diagram of the internal structure of the rotational joint of Embodiment 4.
Figure 26:
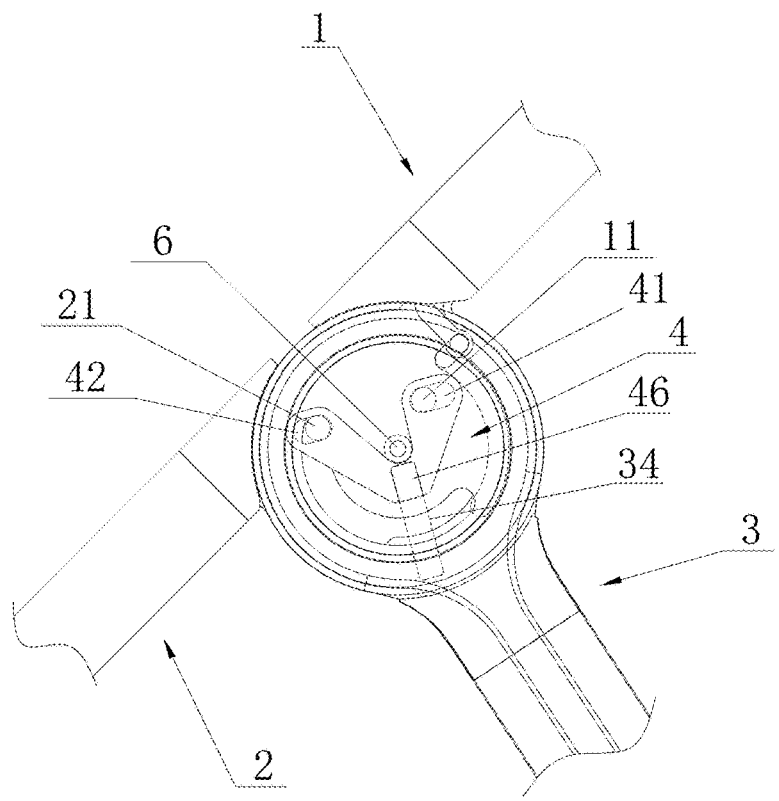
FIG. 26 is a second schematic diagram of the internal structure of the rotational joint of Embodiment 4.

Referring to FIG. 22 to FIG. 26, the difference between this embodiment and Embodiment 2 are mainly that:

in this embodiment, the first guide pillar 11 is arranged on the first linkage rod portion 4c of the linkage member 4, the second guide pillar 21 is arranged on the second linkage rod portion 4d of the linkage member 4, correspondingly, the first guide slot 41 is arranged on the first connecting base 1, and the second guide slot 42 is arranged on the second connecting base 2. The first guide pillar 11 is slidably inserted into the first guide slot 41, and the second guide pillar 21 is slidably inserted into the second guide slot 42. The internal structure of the rotational joint of this embodiment is shown in FIG. 25 and FIG. 26, and its working principle is similar to that of the rotational joint of Embodiment 2, which will not be repeated here.

The above-mentioned rotational joint can also be used for products for children, such as child sitting saddles, dining chairs, rocking chairs, swings, cribs, etc., to realize linked unfolding and folding of the respective rods, which not only reduces the number of rods in the products for children, but also simplifies the structures of the products for children, and makes the opening and folding operations of products for children more convenient.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

I claim:

1. A rotational joint, for a rotational connection among at least three support rods, one of the support rods being a base rod having a base, and the rest of the support rods comprising a first rod having a first connecting base and a second rod having a second connecting base, the first connecting base, the second connecting base and the base being rotationally connected about a same rotation center line, wherein the rotational joint further comprises a linkage member, and the linkage member is arranged in such a manner that the linkage member is capable of only linearly moving relative to the base;

one of the linkage member and the first connecting base is provided with a first guide slot, and the other one is provided with a first guide pillar, and the first guide pillar is capable of being relatively slidably inserted in the first guide slot; one of the linkage member and the second connecting base is provided with a second guide slot, and the other one is provided with a second guide pillar, and the second guide pillar is capable of being relatively slidably inserted in the second guide slot, wherein, an extension direction of the first guide slot and a linear movement direction of the linkage member are not parallel or collinear with each other, and an extension direction of the second guide slot and the linear movement direction of the linkage member are not parallel or collinear with each other.

2. The rotational joint according to claim 1, wherein the extension direction of the first guide slot and the linear movement direction of the linkage member are perpendicular to each other, and/or, the extension direction of the second guide slot and the linear movement direction of the linkage member are perpendicular to each other.

3. The rotational joint according to claim 1, wherein the first guide slot and the second guide slot are both provided on the linkage member, and correspondingly, the first guide pillar is provided on the first connecting base, and the second guide pillar is provided on the second connecting base.

4. The rotational joint according to claim 3, wherein the extension direction of the first guide slot and the extension direction of the second guide slot are parallel to each other or extend in a same direction.

5. The rotational joint according to claim 1, wherein the first guide slot is provided on the first connecting base, and the second guide slot is provided on the second connecting base, and correspondingly, the first guide pillar and the second guide pillar are both provided on the linkage member.

6. The rotational joint according to claim 1, wherein the linear movement direction of the linkage member is perpendicular to the rotation center line.

7. The rotational joint according to claim 1, wherein at least one set of guiding mechanism is provided between the linkage member and the base, and each set of guiding mechanism comprises a sliding pillar arranged on one of the base and the linkage member and extending along the linear movement direction of the linkage member, and a guide hole for the sliding pillar to insert along its length direction in a sliding fit manner which is arranged on the other one of the base and the linkage member.

8. The rotational joint according to claim 7, wherein the linkage member has a protrusion portion, the guide hole is opened on the protrusion portion, and the sliding pillar is provided on the base.

9. The rotational joint according to claim 1, wherein at least one set of guiding mechanism is provided between the linkage member and the base, each set of guiding mechanism comprises a projecting pillar arranged on one of the base and the linkage member, and a sliding slot arranged on the other one of the base and the linkage member and extending along a linear direction, and the projecting pillar is slidably inserted in the sliding slot.

10. The rotational joint according to claim 9, wherein the projecting pillar is arranged on the linkage member, and the sliding slot is arranged on the base.

11. The rotational joint according to claim 9, wherein the linkage member is further provided with a through slot extending in a linear direction, the base, the first connecting base and the second connecting base are rotationally connected via a rotational shaft, the rotational shaft is capable of being rotated around its own axis and can be slidably inserted in the through slot along the through slot, an extension direction of the through slot is perpendicular to a shaft axis of the rotational shaft, and the extension direction of the through slot and an extension direction of the sliding slot are parallel to each other or extend in a same direction.

12. The rotational joint according to claim 9, wherein two sets of guiding mechanism are provided, and in the two sets of guiding mechanism, length extension directions of the sliding slots are parallel to each other or extend in a same direction, and the projecting pillars are arranged on the linkage member, and the two projecting pillars are located on a same side of the linkage member.

13. The rotational joint according to claim 12, wherein the linkage member comprises a first mounting rod portion and a second mounting rod portion that cross each other in a cross shape, the first guide slot and the second guide slot are respective arranged on two end portions of the first mounting rod portion, and the two projecting pillars are respectively arranged on two end portions of the second mounting rod portion.

14. The rotational joint according to claim 13, wherein the two projecting pillars are arranged symmetrically with respect to a center line of the first mounting rod portion, and the first guide slot and the second guide slot are arranged symmetrically with respect to a center line of the second mounting rod portion.

15. The rotational joint according to claim 9, wherein the guiding mechanism further comprises a sleeve sleeved on the projecting pillar to be rotatable around its own axis, and the sleeve is fittingly inserted in the sliding slot.

16. The rotational joint according to claim 1, wherein the linkage member comprises a first linkage rod portion and a second linkage rod portion, wherein one end of the first linkage rod portion and one end of the second linkage rod portion are connected to form a V-shape, the first guide slot or the first guide pillar is arranged on the other end portion of the first linkage rod portion, and the second guide slot or the second guide pillar is arranged on the other end portion of the second linkage rod portion.

17. The rotational joint according to claim 1, wherein the base comprises a first base body and a second base body, the first base body and the second base body cooperate with each other to form an accommodating space, the first connecting base, the second connecting base and the linkage member are located between the first base body and the second base body, and the linkage member is located in the accommodating space.

18. The rotational joint according to claim 1, wherein the rotational joint further comprises a lock mechanism for locking the base, the first connecting base and the second connecting base with respect to each other, the lock mechanism comprises a lock pin movably arranged along a direction perpendicular to the rotation center line, one of the base, the first connecting base and the second connecting base is provided with a lock slot for the lock pin to linearly move, and the other two of the base, the first connecting base and the second connecting base are provided with a cooperating slot, respectively, each cooperating slot comprises a lock slot portion for the lock pin to linearly move, and an arc-shaped guide slot portion in communication with the lock slot portion and taking the rotation center line as a rotation center, and when the lock mechanism is in a locked state, the lock pin is inserted into the lock slot and the lock slot portions of the two cooperating slots at the same time.

19. A product for children, comprising at least three support rods, wherein the at least three support rods are rotationally connected via a rotational joint according to claim 1.

20. The product for children according to claim 14, wherein the product for children is a stroller having a frame, the frame comprises a front support, a rear support and a push rod frame, an upper portion of the front support, an upper portion of the rear support and a lower portion of the push rod frame are rotationally connected via the rotational joint, wherein, the rear support is the base rod.

* * * * *

UNITED STATES PATENT AND TRADEMARK OFFICE
CERTIFICATE OF CORRECTION

| | | |
|---|---|---|
| PATENT NO. | : 11,685,418 B2 | Page 1 of 1 |
| APPLICATION NO. | : 17/291760 | |
| DATED | : June 27, 2023 | |
| INVENTOR(S) | : Hongtao Zhang | |

It is certified that error appears in the above-identified patent and that said Letters Patent is hereby corrected as shown below:

On the Title Page

Column 2, Item (57), Line 11, under Abstract, delete "pillar" and insert -- pillar. --.

In the Claims

In Column 12, Line 45, In Claim 20, delete "14," and insert -- 19, --.

Signed and Sealed this
Eleventh Day of June, 2024

*Katherine Kelly Vidal*

Katherine Kelly Vidal
*Director of the United States Patent and Trademark Office*